(No Model.)

J. R. BENTON.
LAWN RAKE.

No. 281,003. Patented July 10, 1883.

WITNESSES:
Francis McArdle
C. Sedgwick

INVENTOR:
J. R. Benton
BY Munn & Co
ATTORNEYS.

UNITED STATES PATENT OFFICE.

JAMES R. BENTON, OF OSWEGO, NEW YORK.

LAWN-RAKE.

SPECIFICATION forming part of Letters Patent No. 281,003, dated July 10, 1883.

Application filed October 18, 1882. (No model.)

*To all whom it may concern:*

Be it known that I, JAMES R. BENTON, of Oswego, in the county of Oswego and State of New York, have invented a new and Improved Lawn-Rake, of which the following is a full, clear, and exact description.

My invention consists of a lawn-rake constructed as hereinafter described and claimed, the rake being carried by a suitable frame mounted on rollers, so that it acts to gather up leaves and other refuse without being projected into and injuring the sod.

Reference is to be had to the accompanying drawings, forming part of this specification, in which similar letters of reference indicate corresponding parts in both the figures.

Figure 1:
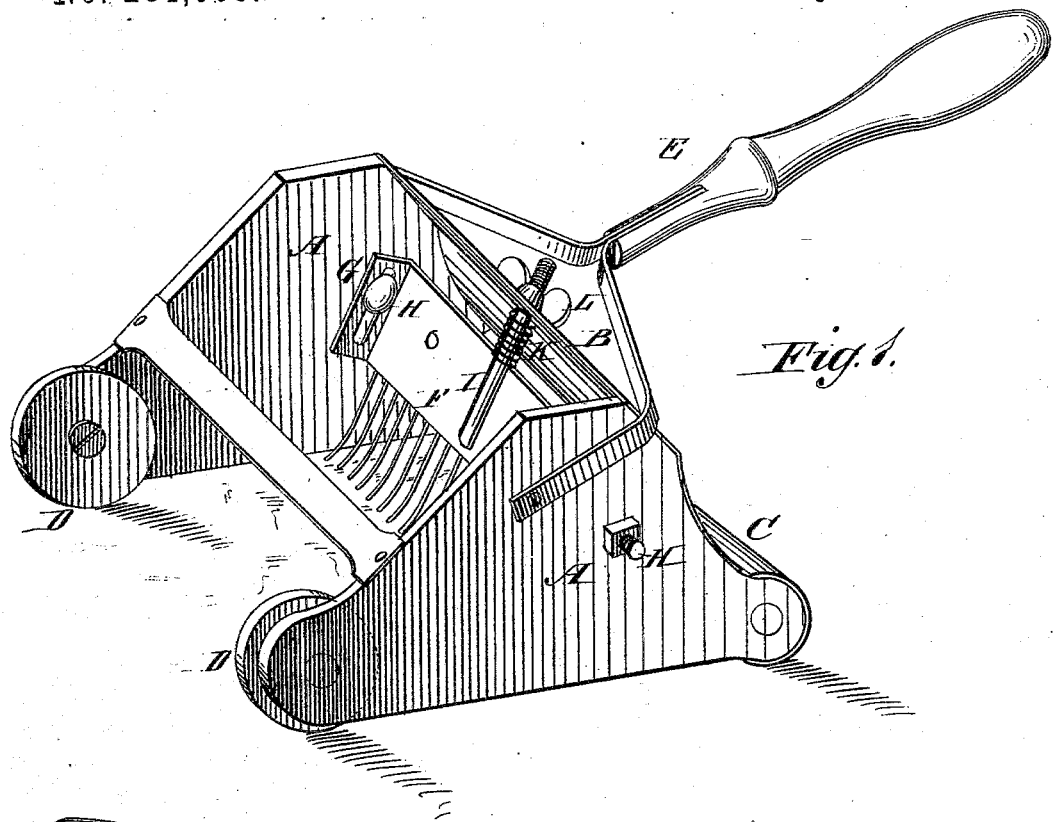
Figure 2:
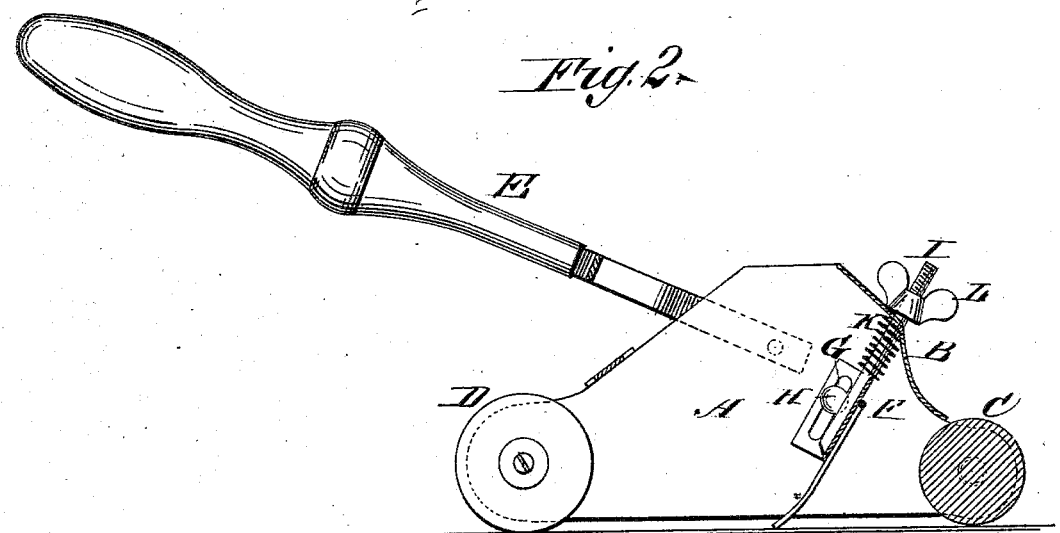

Figure 1 is a perspective view of my improved rake, and Fig. 2 is a vertical section of the same.

The box is composed of two end pieces, A A, connected at the rear side by a plate, B, and fitted with a rear roller, C, and front supporting-wheels, D D, of wide face. A handle, E, is pivoted by its arms to the end pieces, A A, so that it may be turned to either side for pushing or for drawing the rake along the ground.

F is the rake having its head O formed with slotted flanges G G, which take upon pins H in the side pieces, A.

To the middle of the rake is attached a rod, I, which passes up through the plate B of the box, and around this rod is a spiral spring, K, which tends to press the rake downward to the extent allowed by a nut, L, on the rod I above the plate B. This spring also allows the rake to be moved upward in passing obstructions.

In operation, the box and rake being propelled or drawn over the lawn, the rake acts to gather up the leaves and grass. At the same time the rake will not dig into the sod and thereby injure the lawn, as is the case with an ordinary rake. The rake and box may be made of any suitable length, and when made of comparative small size will serve to gather a large quantity of leaves and other refuse before requiring to be emptied.

With this rake a lawn can be readily and quickly cleaned of leaves and of the cut grass after being mowed.

Having thus described my invention, what I claim as new, and desire to secure by Letters Patent, is—

1. The rake F, the rod I, the spring K, and the nut L, in combination with the supporting-box fitted on rollers and provided with a handle, substantially as shown and described.

2. The combination, with the roller-frame A B, of the adjustable slotted rake-head O G, screw-bolts H, rod I, spring K, and nut L, substantially as shown and described.

JAMES ROBERT BENTON.

Witnesses:
CHARLIE A. BENTON,
NATHAN R. GREEN.